June 3, 1924.
W. F. WOOLARD
1,496,333
ARC WELDED PIPE COUPLING
Filed July 28, 1923
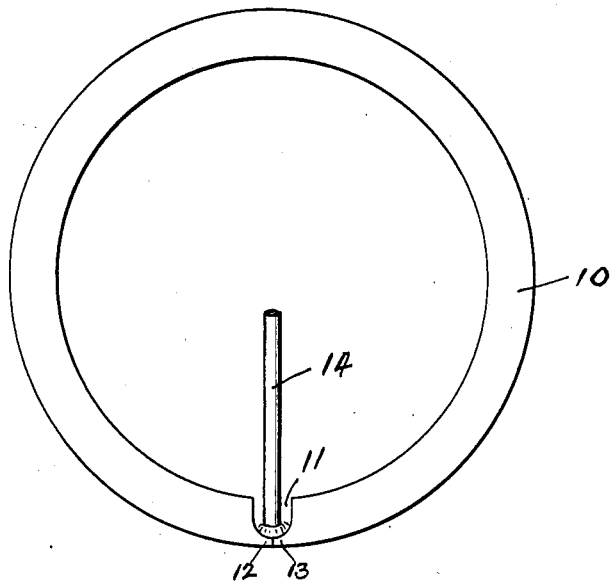
WITNESS
INVENTOR.
W. F. Woolard,
BY
Erwin, Wheeler & Woolard
ATTORNEYS.

Patented June 3, 1924.

1,496,333

UNITED STATES PATENT OFFICE.

WILLIAM F. WOOLARD, OF WAUWATOSA, WISCONSIN, ASSIGNOR TO A. O. SMITH CORPORATION, OF MILWAUKEE, WISCONSIN, A CORPORATION OF NEW YORK.

ARC-WELDED PIPE COUPLING.

Application filed July 28, 1923. Serial No. 654,373.

*To all whom it may concern:*

Be it known that I, WILLIAM F. WOOLARD, a citizen of the United States, and a resident of the city of Wauwatosa, in the county of Milwaukee and State of Wisconsin, have invented certain new and useful Improvements in Arc-Welded Pipe Couplings; and I do declare the following to be a clear, exact, and complete description thereof, such as will enable others skilled in the art to which the invention pertains to make, use, and practice the same.

My invention relates in its particular application to an improvement in the manner of manufacturing large pipe couplings, specifically designed for use in connecting the sections of an oil well casing, but it may be used in the production of all tubular articles having a diameter which will permit its ready application.

On account of the strains which they are required to carry, such couplings are necessarily of heavy gauge material, the thickness of which increases in the ratio of the diameter of the pipes which they are used to connect. Couplings of this character are now generally made from metal plates having a length equal to the circumference of the coupling, which plates are rolled into annular shape with their ends in abutting relation, such ends being joined by arc-welding to produce an integral structure. By reason of the thickness of the plates from which the heavier couplings are formed, it has been difficult to bring the metal in the region of the welding line into a proper state of fusion, and to overcome the difficulty it has been the practice to form an exterior welding groove at the joining line by chamfering the meeting edges or compressing the metal thereat so as to produce a deep groove with a bottom composed of comparatively thin metal.

The thin edges thus produced readily fuse upon the application of the electric arc, and an initial weld is effected in the traverse of a fusible weldrod, such as is now customarily employed in connection with work of this class. This action is followed by depositing successive layers of welding material, furnished by the fusible weldrod, in the groove until the latter is filled and the welded joint is completed. The joint upon the inner side of the coupling is smooth, inasmuch as the original state of the metal comprising the thinned edges is not disturbed at the underside, but at its outer side the joint is rough and requires broaching to restore the symmetry of the exterior of the coupling.

I propose to reverse the operations and weld at the inside of the coupling instead of the outside. By this means, a coupling having a smooth exterior surface which does not require machining to complete its contour is produced, and as a result the metal skin which is formed upon the plate at the rolling mill is not broken. In such couplings, however formed, it is necessary to machine the inside by reaming to size and then threading to make them complete. In my improved coupling, the excess of metal deposited at the inside of the joint is reamed out in the performance of the necessary sizing operation, so that in addition to producing a coupling with a symmetrical and finished exterior, I am enabled to dispense with the extra work that is involved in removing the surplus metal from the exterior surface when the welding is performed at the outer side of the coupling.

The novel features of my invention will be pointed out in the claims appended to this specification.

The drawing accompanying this specification illustrates in a conventional way the manner in which my invention is reduced to practice, as will now be described.

In the drawing, the numeral 10 designates a pipe coupling formed as an annulus of appropriate diameter and length, these dimensions and the gauge of the material from which the coupling is formed being determined by the conditions which are expected to attend the use of the latter.

As hereinbefore indicated, the coupling will be produced by rolling a metal strip into the form of an annulus, with the ends of the strip disposed in abutting relation. A welding groove 11 running lengthwise of the coupling, and formed at the meeting ends of the strip, extends radially from the inner surface of the annulus. The depth of the groove is such that it reduces very greatly the thickness of the underlying metal, and leaves only thin edges 12 and 13 between the bottom of the groove and the exterior of the coupling. This reduction of the ends of the coupling by the provision of the welding groove, greatly facilitates the operation of welding the abutting ends so as to complete the coupling, inasmuch as there is no considerable depth of metal to be penetrated by the heat at any time in effecting the fusion of the parts.

The welding current is conducted by the fusible weldrod 14, at the point of which the arc is formed. The width of the groove is such that the point of the weldrod may be entered therein, and the arc brought to bear directly upon the thin edges 12 and 13, so as to create a proper state of fusion of such edges. The molten metal flowing from the fusible weldrod, as the latter is consumed, unites with the fused edges 12 and 13, so as to constitute an initial weld at the bottom of the groove and extending the length of the coupling. In repeating the welding operation, subsequent layers are deposited in the groove until the latter is filled and the joint completed. In the lateral traverse of the weldrod, the arc fuses the metal at the sides of the groove to the proper degree, as the successive layers are formed.

It is preferred to use fusible weldrods of the covered type, inasmuch as they contribute the additional welding material necessary to fill the groove, and at the same time the covering constitutes a convenient means for carrying elements which under combustion will create a non-oxidizing atmosphere about the welding arc. But it will be within the scope of my invention to use a non-metallic electrode to conduct the current and direct the arc, with separate slugs or bars placed in the groove to supply the welding material as the fusion takes place.

The welding groove may be formed in any desired manner, but I prefer to compress the ends of the plate before rolling it into the annular form shown, that is, with the thinned edges 12 and 13 at the ends of the plate disposed at the circumference so as to produce a finished exterior upon the coupling. The excess of metal deposited at the inside of the welding line will be removed in reaming the coupling to size it for threading. As before stated, this obviates the necessity for any outside finishing.

A single weldrod may be made to traverse the welding line, or a plurality of weldrods operating simultaneously may be employed in building up the welded joint.

The metal plates with chamfered ends may be converted into tubular shape by any means desired. Plates of reasonable thickness may be rolled into such shape, but plates of excessive thickness may be given tubular shape by a succession of die pressing operations.

Having thus described my invention, what I claim and desire to secure by Letters Patent of the United States, is:

1. The method of making electrically welded tubular articles which consists in reducing the opposite ends of a metal plate to form thin projecting edges, converting the said metal plate into an annulus with the said thin edges in abutting relation at the circumference thereof to form a tube having a symmetrical exterior surface and a welding groove upon the inner side of the tube, fusing the ends of the plate in the region of the groove and filling the groove with welding material to constitute an integral structure.

2. The method of making electrically welded tubular articles which consists in reducing the ends of a metal plate to produce thin projecting edges, converting the plate into annular shape with the said thin edges in abutting relation at the circumference thereof to form an inwardly extending welding groove, fusing the adjacent ends of the metal plate, and filling the said groove with molten metal flowing from a fusible weldrod to constitute an integral structure.

3. The method of making electrically welded tubular articles which consists in reducing the ends of a metal plate to produce thin projecting edges, converting the plate into annular shape with the said thin edges in abutting relation at the circumference thereof to form an inwardly extending welding groove, fusing the adjacent ends of the metal plate, and filling the said groove with molten welding material to constitute an integral structure.

4. The method of making electrically welded pipe couplings shaped from blanks reduced at their opposite ends, which consists in converting the said blanks into annular form with the reduced ends in abutting relation at the circumference of the coupling to form a welding groove, and electrically welding the said coupling from the inside thereof by the fusion and deposit of welding material in the welding groove to complete the structure.

5. A pipe coupling formed as an annulus from a metal plate the ends of which are brought into abutting relation, and electrically welded at the inside without disturbing the mill finish of the plate upon the exterior of the coupling.

6. A pipe coupling formed as an annulus from a metal plate having its ends reduced to form thin edges which meet at the circumference of the plate and form a welding groove interiorly thereof, the said ends being fused in the area of the groove, and the latter being filled with welding material to unite the said ends and constitute an integral structure with a symmetrical exterior.

In testimony whereof, I have signed my name at Milwaukee, this 20th day of July, 1923.

W. F. WOOLARD.

Witnesses:
G. G. WUNDER,
EMMA HAUG.